United States Patent

[11] 3,608,071

[72] Inventors Edgar Relyveld
       Paris;
       Marcel Raynaud, Versaille; André Turpin,
       Paris; Monique Digeon, Paris, all of France
[21] Appl. No. 761,278
[22] Filed      Sept. 20, 1968
[45] Patented   Sept. 21, 1971
[73] Assignee   Institut Pasteur
                Paris, France
[32] Priority   Sept. 26, 1967
[33]            France
[31]            122284

[54] MANUFACTURING ADSORBED VACCINES
     7 Claims, No Drawings
[52] U.S. Cl. .................................................. 424/88,
                                              424/92, 424/89
[51] Int. Cl. ........................................... A61k 27/00
[50] Field of Search ............................ 424/88-92;
                                              167/78 AD

[56]              References Cited
              UNITED STATES PATENTS
2,454,755  11/1948  Parfentjev et al. .............  424/92

Primary Examiner—Richard L. Huff
Attorney—McGlew and Toren

ABSTRACT: A method has been found, which makes it possible to prepare a composition containing one or more vaccines adsorbed on an appropriate substrate. The method comprises introducing one or several antigens into an aqueous solution of dibasic sodium phosphate having preferably a concentration of 0.01 M to 0.5 M, adding to the mixture thus formed an amount of calcium chloride in aqueous solution, preferably substantially equivalent to that of the phosphate, and adjusting the pH of the mixture to a value close to 7, preferably about 6.8 to 7. A precipitate forms, which adsorbs the antigens, and it is recovered. The best concentration of the calcium chloride solution is in the range of 0.01 M to 0.5 M.

MANUFACTURING ADSORBED VACCINES

The present invention relates to a new process for the preparation of monovalent or polyvalent vaccines from concentrated preparations absorbed on calcium phosphate gel. These vaccines are usable, preventively or curatively, in human therapeutic as well as in veterinary practice. Storage of vaccines in the concentrated form bears the advantage of requiring minimized place and allowing them to be prepared in large quantity within a relatively short time, when epidemics or other cases of immediate necessity occur. The adsorbed preparations are stable for many years and titrations carried out on concentrated products make it possible to reduce considerably checkings operations of end products.

The manufacturing principle consists in adsorbing monovalent vaccines in concentrated form, and then diluting them either one another or with a preparation of adjuvant. The concentration of the gel remains the same for every operation allowing one to make the mixtures in variable proportions.

The antigens, used in the process in accordance with the invention, may be microbial secretion substances, for instance raw or purified anatoxins, as well as entire micro-organisms such as bacteria, viruses and others, or some or their fractions, specially bacterial coats, treated viruses and so on.

The concentration of vaccines is carried out in accordance with the techniques generally used, that is to say, centrifugation for micro-organisms and some of their fractions, salt or organic solvents precipitation, ultrafiltration, ultracentrifugation, adsorption and elution, electrophoresis, chromatography, etc., for soluble or semisoluble antigens, and for viruses.

According to the invention, the concentrated precipitates or preparations are dissolved in or mixed with a disodium phosphate solution, or again dialyzed against such a solution; a solution of calcium chloride is then rapidly stirred in, the pH of the mixture being adjusted to about 7.

The concentration of the dibasic sodium phosphate solution preferably ranges from 0.01 to 0.5 M, the calcium chloride concentration being equal or neighboring to it; accordingly, the volume of this last solution is preferably equal or near to the phosphate one. Preparations of antigens concentrated 4 to 100 times or more, and adsorbed on calcium phosphate are obtained in this way.

It is sufficient to blend these preparations of adsorbed concentrated vaccines with calcium phosphate gel, prepared in the same way, to get monovalent vaccines; mixed vaccines can be obtained by blending together different monovalent vaccines with the phosphate gel.

The following example illustrates the present invention without however limiting its scope.

EXAMPLE

Manufacturing antidipheric-antitetanic-antipoliomyelitic-antiwhoop vaccine adsorbed on calcium phosphate.

1. Concentrated by salt precipitation diphteric anatoxin is long dialyzed against a 0.07-M (25 g. $Na_2HPO_4 \cdot 12H_2O$ for 1 liter of solution) dibasic sodium phosphate solution. Then the anatoxin in filtered through a Seitz-type sterilizing filter, and diluted with the same phosphate solution (sterilized by autoclaving) to 240 flocculating units per ml. In the solution of anatoxin thus obtained, an equal volume of a 0.07-M calcium chloride solution, that is to say, 10.2 g. of $CaCl_2$ per liter also sterilized by autoclaving, is then stirred. A precipitate of calcium phosphate forms, and the anatoxin is adsorbed on it. The pH of the mixture to 6.8–7 by adding a sterile normal solution of sodium hydroxide. The mixture is allowed to stand for 24 hours at ordinary temperature; then a sample of supernatant liquid is tested by flocculation method to ascertain that it does not contain free anatoxin. The determination of the quantity of adsorbed anatoxin is achieved by eluting the precipitate obtained by centrifuging with a 5 percent sodium citrate solution. The quantity of eluted anatoxin is equal to the concentration degree; its titration is again made by flocculation. The concentrated preparation can be kept in cold room several years.

2. Tetanic anatoxin is long dialyzed against a 0.07-M (25 g. $Na_2HPO_4 \cdot 12H_2O$ for a total volume of 1 liter) dibasic sodium phosphate solution. Then the anatoxin is filtered through a Seitz-type sterilizing filter and diluted to 240 flocculating units per ml., with the same phosphate solution previously sterilized by autoclaving.

To the solution of anatoxin thus obtained, an equal volume of a 0.07-M (10.2 g. $CaCl_2 \cdot 2H_2O$ per liter) calcium chloride solution, sterilized by autoclaving, is then added under stirring. A precipitate of calcium phosphate forms, and the anatoxin is adsorbed on it.

The pH of the mixture is settled to 6.8–7 by adding a sterile normal sodium hydroxide solution. The mixture is allowed to stand for 24 hours at room temperature; by the above-mentioned method it is ascertained that almost the whole anatoxin has been adsorbed on the calcium phosphate gel. The preparation can keep several years in cold room.

3. Manufacturing concentrated monovalent antipoliomyelitic vaccines, adsorbed on calcium phosphate.
   I. Concentration of inactivated monovalent vaccines. The vaccines are concentrated by ultrafiltration and their volume is reduced at about one one-hundredth of the starting volume. The ultrafiltration is carried out through films from an acetic solution of having 8 percent cellulose nitrate. Filter cartridges are used as support. Each preparation is long dialyzed against a 0.07-M dibasic sodium phosphate solution, then centrifuged and filtered through the Seitz-type sterilizing filters, able to give a bacteriologically sterile filtrate.
   II. Adsorption on calcium phosphate.

An equal volume of a 0.07-M calcium chloride solution, sterilized by autoclaving, is stirred in a solution of sterile, concentrated, inactivated vaccine, obtained in accordance with I. A precipitate of calcium phosphate forms, which adsorbs the totality of the inactivated virus. Several tests performed with nonactivated poliomyelitic virus, have demonstrated the adsorption. Indeed, the top liquid, obtained after the centrifugation of the suspension, is practically free of virus. The pH of the suspension is adjusted to 6.8–7, by means of a normal sodium hydroxide solution previously sterilized by autoclaving. The preparation of vaccine adsorbed on calcium phosphate thus obtained is 50 times more concentrated than the fluid starting vaccine. This preparation can also keep several years in cold room.

4. Manufacturing antiwhoop vaccine, adsorbed on calcium phosphate.

The Bordetella pertussis bacilli; killed and centrifuged, are homogenized in a 0.07-M (25 g. $Na_2HPO_4 \cdot 12H_2O$ for a total volume of 1 liter) dibasic sodium phosphate sterile solution so as to obtain $4 \times 10^{10}$ bacilli per ml. An equal volume of a 0.07-M(10.2 g. $CaCl_2 \cdot 2H_2O$ per liter) calcium chloride solution, also sterilized by autoclaving, is then added to the suspension of germs thus obtained. A precipitation of calcium phosphate occurs.

The pH of the mixture is brought to 6.8–7 by adding a sterile normal solution of sodium hydroxide. The deposit of gel, which lets a limpid supernatant liquid, shows the adsorption of bacilli. The preparation can again be kept in cold room.

5. Preparation of mixed vaccine.

The adsorbed anatoxins, the preparations of concentrated adsorbed monovalent antipoliomyelitic vaccines and the antiwhoop vaccine, adsorbed on calcium phosphate, are blended with a calcium phosphate suspension prepared as above indicated and sterilized by autoclaving. One volume of adsorbed diphteric anatoxin 120 UF/ml. is blended with one volume of adsorbed 120 UF/ml. tetanic anatoxin, one volume of adsorbed antiwhoop vaccine containing $4 \times 10^{10}$ bacilli per ml., and one volume of calcium phosphate containing suitable quantities of adsorbed antipoliomyelitic vaccines. Thus the anatoxins and the antiwhoop vaccine are diluted to 1/4; the proportions of each of the monovalent poliomyelitic vaccines to be used depend on the results of titrations previously made on their samples.

A concentrated solution of antiseptic is then added in suitable quantity.

A sample of the associated vaccine, thus prepared, is centrifuged, in order to check that supernatant liquid does not contain free anatoxin.

The precipitate of the centrifugation is eluted with a sodium citrate solution, and titrated by flocculation in order to check the anatoxin adsorption.

The antigenic property of every constituent of the vaccine is then tested by determining the vaccinating power in animal in accordance with usual methods.

We claim:

1. Method for the preparation of a composition including a vaccine in the adsorbed state, in which an antigen is introduced into an aqueous solution of dibasic sodium phosphate, a calcium chloride aqueous solution is added to the mixture formed and the pH of the mixture is adjusted to a value of about 7, and further the precipitate thus obtained is collected.

2. Method according to claim 1, wherein the dibasic sodium phosphate solution and the calcium chloride solution have substantially similar molar concentrations of 0.01 to 0.5 M.

3. Process in accordance with claim 2, characterized in that the amount of calcium chloride added is of 1 mole per mole of dibasic sodium phosphate.

4. Process in accordance with claim 1, characterized in that the pH of the mixture is adjusted to a value of about 6.8 to 7.

5. Process in accordance with claim 1, in which the antigen is taken in the concentrated state.

6. Process in accordance with claim 5, in which the antigen is introduced into the dibasic sodium phosphate solution by dialysis.

7. Process in accordance with claim 1 in which the antigen is made of a substance secreted by micro-organisms.